United States Patent [19]
Anderson

[11] 3,721,454
[45] March 20, 1973

[54] TOBOGGAN TOW-BAR

[76] Inventor: Charles E. Anderson, 31355 Rosenbusch Dr., Warren, Mich. 48093

[22] Filed: Feb. 11, 1971

[21] Appl. No.: 114,609

[52] U.S. Cl. ................................................. 280/24
[51] Int. Cl. .............................................. B62b 13/00
[58] Field of Search .................. 280/24, 18, 19, 12 R

[56] References Cited

UNITED STATES PATENTS 3,560,013   2/1971   Lee ........................................ 280/24

FOREIGN PATENTS OR APPLICATIONS 161,568   10/1957   Sweden ................................. 280/24

Primary Examiner—Benjamin Hersh
Assistant Examiner—Robert R. Song
Attorney—William T. Sevald

[57] ABSTRACT

A tow-bar for trailing a toboggan with pulling and braking characteristics behind a towing vehicle having parallel cross-members which engage the toboggan in confined condition at the back and front surfaces of the front curved portion of the toboggan and side members which engage the side edges of the front curved portion of the toboggan. The arrangement prevents sidewise pivotal movement while allowing up and down pivotal movement therebetween. A tongue extends from the cross and/or side members for mounting a hitch thereon for connection to a towing vehicle. While the tow-bar allows up and down hinging movement it constitutes an axial extension of the toboggan devoid of conventional mechanical attaching means and devoid of lateral pivotal movement at the toboggan which substantially reduces fish-tailing and eliminates jack-knifing between the tow-bar and the toboggan and reduces jack-knifing between the toboggan and the towing vehicle.

7 Claims, 7 Drawing Figures

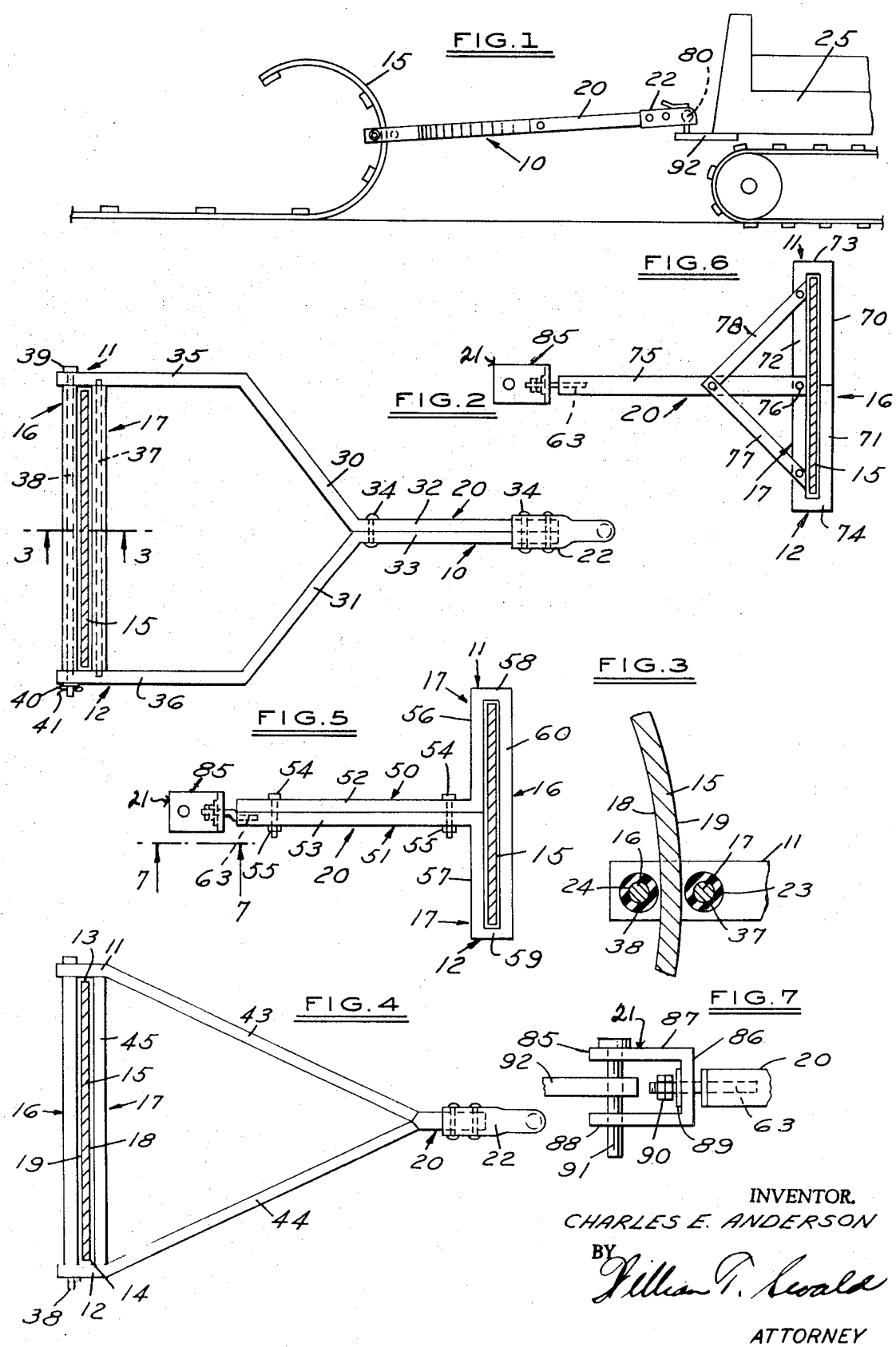

TOBOGGAN TOW-BAR

The invention relates to a tow-bar for trailing a toboggan behind a towing vehicle with both drawing and braking effect.

An object of the invention is to provide a tow-bar for trailing a toboggan behind a towing vehicle, such as a snow-mobile, which is simple in design and construction, inexpensive to make, and easy to mount and remove.

An object of the invention is to provide a tow-bar which has side members which lie adjacent to and confine the side edges of the front curved portion of the toboggan and transverse draw and brake cross-members which lie adjacent to and confine the back and front surfaces of the front curved portion of the toboggan thereby securely mounting the tow-bar on the toboggan without using nuts, bolts, screws, and similar attaching devices on the toboggan.

An object of the invention is to provide a tow-bar which is easily, quickly, and securely mounted on a toboggan without the use of tools and without making holes in the toboggan.

An object of the invention is to provide a tow-bar for a toboggan which allows up and down pivotal movement therebetween but which constitutes an axial extension of the toboggan devoid of lateral pivotal movement at the toboggan to eliminate jack-knifing between the tow-bar and the toboggan, to substantially reduce if not eliminate fish-tailing between the tow-bar and the toboggan, and to substantially reduce both fish-tailing and jack-knifing between the toboggan and the towing vehicle.

These and other objects of the invention will become apparent by reference to the following description of a tow-bar embodying the invention, taken in connection with the accompanying drawing, in which:

FIG. 1 is a side elevational view of a tow-bar embodying the invention connected between a towing vehicle and a toboggan, both shown schematically and broken away to foreshorten the view.

FIG. 2, is an enlarged top-plan view of the tow-bar seen in FIG. 1, with the toboggan curved portion shown in cross-section and the transverse cross-members inside the resilient bumpers shown in broken lines.

FIG. 3, is an enlarged cross-sectional view of a portion of the device and toboggan seen in FIG. 2, taken on the line 3—3 thereof and showing the transverse cross-members and resilient bumpers in more detail.

FIGS. 4, 5, and 6 are views similar to FIG. 2, showing modifications of the novel tow-bar; and FIG. 7 in an enlarged side elevational view of the hitch portion seen in FIGS. 5 and 6 taken on the line 7—7 of FIG. 5, showing the tongue portion broken away and showing a drop pin and vehicle tow-plate in addition.

Referring now to the drawing wherein like numerals refer to like and corresponding parts throughout the several views, the tow-bars 10 disclosed therein to illustrate the invention comprise paired spaced side members 11 and 12 which lie adjacent to the side edges 13 and 14 of the curved front portion 15 of the toboggan in abutting and confining relationship; paired spaced transverse draw member 16 and brake member 17 connected between the side members 11 and 12 and which lie adjacent to the rear surface 18 and front surface 19 of the curved front portion 15 of the toboggan in abutting and confining relationship; and a tongue portion 20 connected to side members 11 and 12 and/or transverse members 16 and 17. A preferred pivotal clevis hitch 21, a ball and socket hitch 22, or other hitch, is mounted on the front end of the tongue portion 20 to facilitate attachment of the tow-bar 10 to a towing vehicle 25 equipped with mating hitch parts. Resilient bumpers 23 and 24 preferably overlie the cross members 16 and 17 and cushion-wise engage the toboggan surfaces 18 and 19.

In the embodiment of FIG. 2, paired off-set bent legs 30 and 31, such as of square tubing, have adjacent portions 32 and 33 interconnected by rivets 34 constituting the tongue portion 20, spaced foot portions 35 and 36 constituting the side members 11 and 12, and spaced paired cross-bars 37 and 38 constituting the transverse or cross-members 16 and 17. The cross-bar 37 is set in an aperture in the near walls of the legs 30 and 31 and held by the imperforate far walls of the legs 30 and 31. The cross-bar 38 lies in apertures through both said walls of the legs 30 and 31 and is removably positioned by the head 39 at one end and the washer 40 and cotter pin 41 at the other end. The bumpers 23 and 24 may be sleeves, such as rubber hose sections, and they overlie the cross-bars 37 and 38.

In the embodiment of FIG. 4, paired legs 43 and 44 diverge from the tongue portion 20 to which they are attached at one end. The legs 43 and 44 at their spaced rear ends terminate in foot portions which constitute the side members 11 and 12. A tubular fixed cross-bar 45 is connected between the legs 43 and 44 adjacent their rear ends and a removable cross-bar 38 is spaced paralleled thereto as in FIG. 2. The cross-bars 38 and 45 constitute the transverse or cross-members 16 and 17 respectively.

In the embodiment of FIG. 5, paired triple off-set bent legs 50 and 51 have adjacent portions 52 and 53 interconnected by bolts 54 and nuts 55. The legs 50 and 51 have right angle diverging portions 56 and 57 leading from the portions 52 and 53 constituting the toboggan surface abutting and confining brake cross-member 17. The legs 50 and 51 have knee portions 58 and 59 leading from the diverging portions 56 and 57 at a right angle thereto so as to lie spaced and parallel relative to one another to constitute the toboggan edge abutting and confining side members 11 and 12. The legs 50 and 51 have a common foot portion 60 leading at a right angle between the knee portions 58 and 59. The foot portion 60 constitutes the toboggan surface engaging and abutting draw cross-member 16. A hitch bolt 63 is welded in the front end of one leg 50 or 51 for attachment to a towing vehicle as hereinafter set forth. While the tow-bar of FIG. 5 is shown made from one piece, it will be understood that it may be made from two or more pieces and interconnected. Also one adjacent leg portion 52 or 53 may be deleted and the diverging portions 56 and 57 interconnected at the remaining leg portion 52 or 53.

In the embodiment of FIG. 6, paired interconnected foot portions 70 and 71 are butt-welded together at their adjacent ends and constitute the toboggan surface abutting and confining draw cross-member 16, and a leg portion 72 lies spaced and parallel to the foot portions 70 and 71 and constitutes the toboggan surface abutting and confining brake member 17. Paired spaced knee portions 73 and 74 are formed integral between the ends of the leg portion 72 and the foot portions 70 and 71 respectively thereby interconnecting and supporting the portions relative to one another. The knee portions 73 and 74 constitute the toboggan edge abutting and confining members 11 and 12. A bar 75 lies normal to the leg 72. A screw 76 connects one end of the bar 15 to the middle of the leg 72. Braces 77 and 78 are attached by screws between the bar 75 and leg 72. The bar 75 constitutes the tongue 20.

The tow-bar embodiments of FIGS. 2 and 3 have a removable bar 38 allowing for closer abutment between the tow-bar members and the front curved portion of the toboggan. The embodiments of FIGS. 5 and 6 have a fixed cross-members 16 and 17 and they are spaced slightly farther apart for moving over the front curved portion 15 of the toboggan and the toboggan cross cleats.

In use, the draw-cross-member 16 under towing conditions engages in the pocket or front apex of the front curved portion 15 of the toboggan. Under braking conditions both the draw cross-member 16 and the brake cross-member 17 jam the front curved portion 15 between them in an interlock. This interlock may occur above or below the draw position shown in FIG. 1. It will be understood that this braking interlock is reliable and effective as it cannot be avoided unless the tongue portion 20 is swung radially in an arc over the front curved portion 15 of the toboggan. Since the tongue portion 20 cannot so swing when hitched to the towing vehicle, the interconnection for braking between the tow-bar 10 and the toboggan is secure.

A ball 80 may be mounted on the towing vehicle 25 and a mating hitch 22 may be riveted or bolted on the tongue portion 20, FIGS. 1, 2 and 4. This type hitch allows for limited side-wise relative angular movement between the towing vehicle 25 and tow-bar 10 and the toboggan. But if the towing vehicle tips over sidewise, this limited movement will not be sufficient to allow the tow-bar 10 and the toboggan to remain upright. For this reason a full relative angular movement hitch is preferred and is now described.

The full rotational hitch comprises a U-shaped member 85 having a web and paired arms 87 and 88. An aperture is formed in the web 86 for receiving the bolt 63. A washer 89 and one or more jam nuts 90 fit over the bolt 63 and engage the web 86 and mount the member 85 on the tongue portion 20 so that it is free to pivot about the axis of the tongue member 20. The arms 87 and 88 have alined apertures for receiving a drop pin 91. The drop pin 91 also fits in the aperture of the tow plate 92 which lies between the arms 87 and 88 to connect to the hitch to a towing vehicle. Due to the fact that the hitch has full free pivotal movement relative to the tongue member 20 when connected to a towing vehicle, the vehicle and hitch can turn over or rotate sidewise without exerting any tipping influence on the tow-bar and the toboggan. Thus, if a towing snow-mobile turns over sidewise, the rotational movement of the member 85 is sufficient to allow the tow-bar and toboggan to remain upright. The hitch member 85 may be permanently attached to the tow-bar 10 by positioning the bolt 63 with its head overlying the web 86 and with its shank welded to the tongue member 20.

The novel tow-bar of the invention enables a snow-mobile operator to use an easy to pull, inexpensive, light-weight, low-center of gravity, and stable toboggan instead of the hard to pull, expensive, heavy, high center of gravity and unstable sled usually used. The tow-bar thus gives the user a very much better facility for additional passengers, equipment and baggage for only a small fraction of the cost.

I claim:

1. A tow-bar for trailing a toboggan behind a towing vehicle with drawing and braking effect and control wherein the toboggan has an upwardly curved front portion defined by opposite rear and front surfaces and opposite side edges; said tow-bar comprising;

a transverse draw-member for overlying the rear surface of the curved front portion of a toboggan to provide towing engagement therewith; said draw member having opposite ends;

paired opposed spaced linear side members connected to said opposite ends of said draw-member for overlying the opposite side edges of the curved front portion of a toboggan in confining relationship therebetween;

a transverse brake-member lying parallel to and spaced from said draw-member for overlying the front surface of the curved front portion of a toboggan to provide braking engagement therewith;

said brake-member being connected to said side members; and a tongue member having first and second opposite ends with said first end interconnected to said draw-member, said brake-member and said side members; said tongue member (other said) second end being a hitch end for connection to a towing vehicle;

said tow-bar under towing conditions drawing the toboggan via said draw member abutting the rear surface of the front curved portion of the toboggan;

said tow-bar under braking conditions braking the toboggan via said brake member abutting the front curved surface of the toboggan.

2. In a tow-bar as set forth in claim 1, one said transverse draw member and brake member being remountably removable from said tow-bar for positioning a toboggan curved front portion between said (linear foot) side members and securing it therebetween and between said draw and brake members.

3. In a device as set forth in claim 1, a resilient bumper on said transverse draw and brake members to provide non-abrading contact with the surfaces of the curved front portion of a toboggan.

4. In a device as set forth in claim 1, said first end of said tongue member being connected to said side members via said brake member.

5. In a device as set forth in claim 1, said first end of said tongue member being connected directly to said side members.

6. In a device as set forth in claim 1, said first end of said tongue member being connected directly to said brake member.

7. In a device as set forth in claim 1, said first end of said tongue member being connected directly to said draw member.

* * * * *